(12) United States Patent
Perarnau Ramos et al.

(10) Patent No.: US 7,703,820 B2
(45) Date of Patent: Apr. 27, 2010

(54) BUMPER REINFORCING CROSS-MEMBER

(75) Inventors: Francesc Perarnau Ramos, Sabadell (ES); Julio Peidro Aparici, Barcelona (ES); Michel Garcia, Abadiano (Bizkaia) (ES); Antonio Bacares, Abadiano (Bizkaia) (ES)

(73) Assignee: Autotech Engineering, A.I.E., Abadiano (Bizkaia) (ES)

( * ) Notice: Subject to any disclaimer, the term of this patent is extended or adjusted under 35 U.S.C. 154(b) by 0 days.

(21) Appl. No.: 11/912,951

(22) PCT Filed: Apr. 29, 2005

(86) PCT No.: PCT/ES2005/000230

§ 371 (c)(1),
(2), (4) Date: Nov. 18, 2008

(87) PCT Pub. No.: WO2006/117412

PCT Pub. Date: Nov. 9, 2006

(65) Prior Publication Data

US 2009/0058111 A1 Mar. 5, 2009

(30) Foreign Application Priority Data

Apr. 29, 2005 (WO) ............... PCT/ES2005/000230

(51) Int. Cl.
*B60R 19/18* (2006.01)
(52) U.S. Cl. ..................... 293/155; 293/102
(58) Field of Classification Search ............. 293/102, 293/120, 155, 154
See application file for complete search history.

(56) References Cited

U.S. PATENT DOCUMENTS

| 5,634,255 | A | 6/1997 | Bishop |
| 5,724,712 | A | 3/1998 | Bishop |
| 5,961,858 | A | 10/1999 | Britnell |
| 6,426,153 | B1 | 7/2002 | Duley et al. |

(Continued)

FOREIGN PATENT DOCUMENTS

JP 2001-180398 7/2001

OTHER PUBLICATIONS

International Search Report for PCT International Application No. PCT/ES2005/000230 dated Oct. 28, 2005.

*Primary Examiner*—Joseph D Pape
(74) *Attorney, Agent, or Firm*—RatnerPrestia

(57) ABSTRACT

The invention relates to a bumper cross-member including an elongated body having a three-dimensional configuration formed from several metal sheet elements joined together by welding and shaped. The three-dimensional configuration has a non-uniform open transversal section along the body. The method includes joining several metal sheet elements together by welding in order to produce a flat tailored blank and shaping the tailored blank to produce the body. Shaping is carried out by hot or cold stamping. The several metal sheet elements can be joined either mutually adjacent or overlaid by different welding techniques, they can be of different of identical thicknesses and of the same type or different types of steel.

19 Claims, 4 Drawing Sheets

U.S. PATENT DOCUMENTS

| | | |
|---|---|---|
| 6,590,180 B1 | 7/2003 | Suh et al. |
| 6,675,620 B1 | 1/2004 | Heyll et al. |
| 6,726,259 B2 | 4/2004 | Kettler et al. |
| 6,779,821 B2 | 8/2004 | Hallergren |
| 2003/0111851 A1 | 6/2003 | Kettler et al. |
| 2004/0007886 A1 | 1/2004 | Hallergren |
| 2004/0135384 A1 | 7/2004 | Pritchard et al. |
| 2006/0028032 A1* | 2/2006 | Henseleit .................... 293/102 |

* cited by examiner

BUMPER REINFORCING CROSS-MEMBER

This application is a U.S. National Phase Application of PCT International Application No. PCT/ES2005/000230, filed Apr. 29, 2005.

FIELD OF THE ART

The present invention relates to a steel bumper reinforcing cross-member applicable in the automotive industry.

STATE OF THE PRIOR ART

In the field of metal part manufacturing the technique of joining several flat metal sheet elements together by means of welding to produce a tailored blank and subsequently shaping said tailored blank to produce a body with a three-dimensional configuration is well known. The term tailored blank is used in this specification to refer both to tailored blanks obtained from sheet elements arranged with their edges adjacent and tailored blanks obtained from overlaid sheet elements, known in the field as patchwork blanks. The benefit of these techniques is that a shaped body with different resistances in different areas therein can be achieved by strategically joining adjacent sheet elements of different thicknesses or different characteristics, or locally overlaying two or more sheet elements, when carrying out the tailored blank.

U.S. Pat. No. 5,634,255 describes a method and apparatus for forming, stacking and transporting tailored blanks obtained from different adjacent metal sheet elements with their edges slightly overlaid and joined by mash welding.

U.S. Pat. No. 5,724,712 describes a method and apparatus similar to the previous one for forming, stacking and transporting tailored blanks obtained from different adjacent metal sheet elements butt jointed by bead welding.

U.S. Pat. No. 5,961,858 describes a laser welding apparatus employing a tilting mechanism for manufacturing tailored blanks obtained from different sheet elements of different materials.

U.S. Pat. No. 6,426,153 describes a tailored blank obtained from different overlaid sheet elements. The tailored blank is suitable for being subsequently pressure shaped between two half-molds in order to make an automobile door panel, for example.

U.S. Pat. No. 6,675,620 describes a process for manufacturing vehicle body components of large surface area from a flat tailored blank. It comprises shaping the blank in two consecutive stamping steps.

Japanese patent No. 2001180398 describes a bumper cross-member formed from a tailored blank obtained from adjacent sheet elements, subsequently shaped by roll-form manufacture in order to obtain a bumper cross-member in the shape of a tubular body having an open cross-section with different resistance characteristics in a central region and in the end regions by virtue of the different characteristics of the metal sheet elements forming the cross-member.

US patent application No. 2004/0135384 describes a bumper cross-member having a uniform open cross-section obtained by extrusion or roll-form manufacture.

U.S. Pat. No. 6,726,259 describes a bumper cross-member obtained by roll-form manufacture having several joined sheet elements overlaid or butt jointed in several areas longitudinally along the cross-member.

U.S. Pat. No. 6,590,180 describes the technique of preparing a tailored blank obtained from two sheet elements of different thicknesses butt jointed by laser welding and then shaping such blank by means of a press for obtaining an element to be used in the bumper of a vehicle.

U.S. Pat. No. 6,779,821 describes a bumper cross-member defining a main groove having a U-shaped cross-section that is uniform from one end of the cross-member to the other and a secondary groove having a non-uniform cross-section, the depth of which decreases towards both ends of the cross-member.

None of the documents cited describes a bumper reinforcing cross-member made from joined sheet elements and subsequently shared preferably by hot or cold stamping in order to form an elongated body having an open cross-section defining a main groove and a secondary groove decreasing in depth as they approach the ends.

DISCLOSURE OF THE INVENTION

The present invention provides a bumper reinforcing cross-member of the type comprising an elongated body having a three-dimensional configuration formed from several metal sheet elements joined together by means of welding, and subsequently shaped. The bumper cross-member of the present invention is characterized in that said three-dimensional configuration has a non-uniform open cross-section along said body having a three-dimensional configuration.

The several metal sheet elements can be joined adjacently or overlaid and can be of the same type of steel or of different types of steel. When they are of the same type of steel the different sheet elements are of different thicknesses whereas if they are of different types of steel they can have a different or identical thickness. Therefore, the different areas of the bumper cross-member defined by the different sheet elements have different resistance characteristics.

The bumper cross-member of the present invention can have any elongated three-dimensional configuration having a variable open cross-section suitable for being obtained by stamping. For example, an elongated three-dimensional configuration having a non-uniform open cross-section along said body and with a main groove longitudinally ended at its side edges by flanges turned outwards.

A method for manufacturing a bumper reinforcing cross-member is described herein, the method being of the type which comprises joining together several metal sheet elements by means of welding to produce a tailored blank and shaping said tailored blank to produce an elongated body with a three-dimensional configuration. The method comprises shaping the tailored blank by stamping, providing said three-dimensional configuration with a non-uniform open cross-section along said body.

The final shaping of the bumper cross-member by stamping has the advantage that it allows using the technique of tailoring the blank from adjacent sheet elements (tailored blank) and that of tailoring the blank from overlaid sheet elements (patchwork blank), or even a combination of both to locally reinforce the bumper cross-member. The tailored blank technique allows designing the bumper cross-member with different resistances in different areas, according to the different requirements or according to the different standard tests to which the bumper cross-member will be subjected. The patchwork blank technique provides greater design flexibility because it allows reinforcing much more locally and specifically those areas of the bumper cross-member which most need it, at the same time having technical advantages equivalent to those obtained by means of the tailored blank technique. A tailored blank made by a combination of plate elements overlaid and adjacently joined is also considered.

Shaping the tailored blank by stamping can be carried out by means of well known cold stamping or hot stamping techniques. Two variants are provided for the hot stamping technique. A first hot stamping variant comprises heating the blank, by way of a merely orientative example, to a temperature of approximately 750° C. to 950° C. immediately before the stamping process and stamping the blank while it is hot. A second hot stamping variant comprises, for example, making a pre-shaping, i.e. a partial shaping of the blank, by cold stamping and subsequently completing the shaping by means of a conventional hot stamping process, i.e. heating the pre-formed blank, by way of a merely orientative example, to a temperature of approximately 750° C. to 950° C. immediately before the final stamping process. With both variants of the hot stamping technique, the plate elements used to tailor the blank can be advantageously of one or more very high resistance boron steels, i.e. boron steels reaching an elastic limit above approximately 1000 N/mm$^2$ at the end of the process. The cold stamping technique is conventional and comprises shaping the blank at room temperature. In this case high resistance steels reaching an elastic limit comprised approximately between 400 and 1000 N/mm$^2$ at the end of the process can be used.

The bumper cross-member of the present invention, regardless of the stamping technique used, has a significantly high general resistance and a locally increased resistance in one or more areas of the cross-member without an increase in weight compared to the cross-members of the state of the art in that the manufacturing method allows for a distribution of the thicknesses and/or the characteristics of the steel as suitable to the different areas of the bumper cross-member.

The use of an either hot or cold stamping technique for obtaining the bumper cross-member of the present invention implies that the bumper cross-member will have an open profile, but it also has the advantage of easily allowing the bumper cross-member to be given a general arched shape having a variable curvature, adapted to the interior surface of any type of rear or front plastic bumper of a vehicle. A studied design of this variable curvature also allows optimizing the results of resistance of the bumper cross-member in the different standard tests as well as complying with other requirements under demand. A bumper cross-member made of strategically designed high or very high resistance steels can obtain good results in cross-member reparability tests, pole crash tests, off-centered or centered pendulum impact tests, tow hook tests and stiffness tests with reduced weight compared to bumper cross-members with other characteristics and/or obtained by other known methods, or as is equivalent, it can obtain better results in different tests for the same weight compared to other state of the art cross-members.

For example, it is possible to increase the performance in the tow hook test even more by reinforcing the sheet corresponding to the area of the bumper cross-member closest to the tow hook support with a greater thickness. In addition, if additional resistance is desired in the central area or rather in the outermost area of the bumper cross-member to obtain good results in the pendulum impact tests, these areas can be locally reinforced by placing sheet elements that are thicker or have a higher resistance in the corresponding areas, without suffering the drawback in terms of weight increase that would be involved if the whole shaped piece was made from the thicker sheet.

The possibility of converting the open section of the bumper cross-member of the present invention into a closed section by joining a metal cover by means of welding, for example stitch laser welding, must also be pointed out, although continuous laser welding is not ruled out. This closed cross-section obtained in cooperation with said metal cover provides an advantage as for the stiffness of the bumper cross-member, given that the inertia of a closed section is generally greater that that of an open section and improves the results of the pendulum impact and pole crash tests.

BRIEF DESCRIPTION OF THE DRAWINGS

The previous and other advantages and features will be more fully understood from the following detailed description of exemplary embodiments with reference to the attached drawings, in which.

DETAILED DESCRIPTION OF EXEMPLARY EMBODIMENTS

Figure 1:
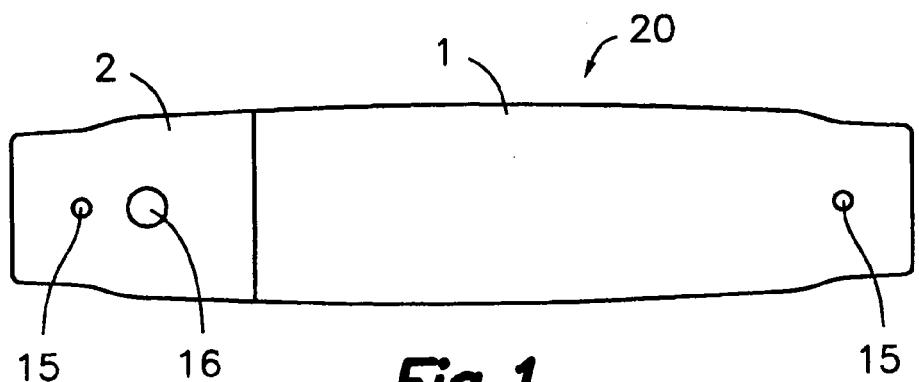
FIG. 1 is a plan view of a tailored blank for obtaining a bumper reinforcing cross-member according to an embodiment of the present invention.

Referring first to FIG. 1, reference numeral 20 indicates in general a flat tailored blank obtained by joining several metal sheet elements together by means of welding. FIG. 1 shows a simple example of said tailored blank 20 comprising only two sheet elements 1, 2, although in other more complex examples the tailored blank 20 can include any number of sheet elements as will be seen below. Here the mentioned two sheet elements 1, 2 are a larger sheet element 1, spanning a central area and one of the ends, and a smaller sheet element 2, located adjacent to said larger sheet element 1 spanning the other end. The two metal sheet elements 1, 2 are butt jointed by means of a technique selected among a group including laser welding, plasma welding and high frequency welding, among others. Once prepared, the tailored blank 20 of FIG. 1 is shaped by stamping in order to produce an elongated body 10 with a three-dimensional configuration having a non-uniform open cross-section along said body 10.

Figure 2:
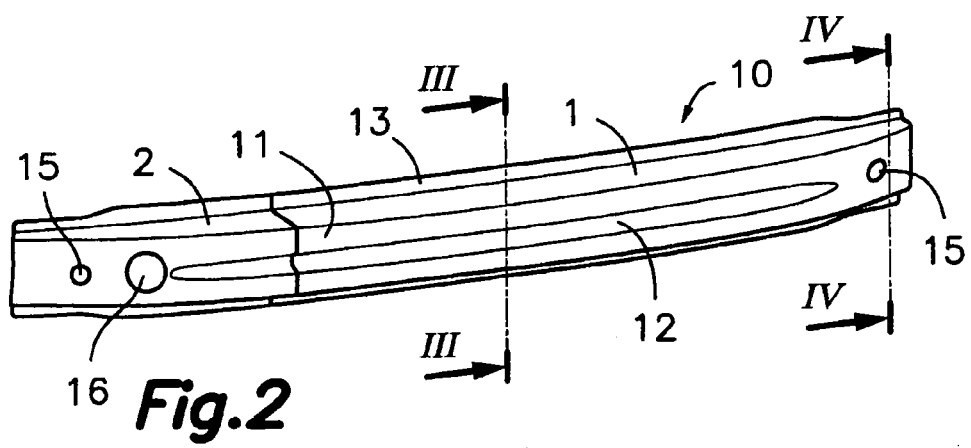
FIG. 2 is a perspective view of a bumper reinforcing cross-member obtained from the tailored blank of FIG. 1.

FIG. 2 shows a bumper reinforcing cross-member intended for a vehicle and basically comprising the mentioned body 10. In general the body 10 is elongated and has a three-dimensional configuration, and incorporates the two metal sheet elements 1, 2 joined together by means of welding and shaped. The mentioned three-dimensional configuration comprises a general arched shape longitudinally along the body 10 and a main groove 11 extending along the entire body 10 substantially spanning the width thereof. The body 10 usually includes near its ends, a pair of assembly holes 15 used for attaching the bumper cross-member to the vehicle, for example by means of impact absorbing elements (not shown). It is also common that the body 10 includes an opening 16 provided for installing a tow anchor (not shown) of the vehicle. In the embodiment of FIGS. 1 and 2, the mentioned opening 16 for the tow anchor is carried out in the smaller sheet element 2, which with the purpose of providing a greater resistance to the area of the tow anchor, has a larger thickness than the larger sheet element 1 or is made of steel with greater resistance characteristics than the larger sheet element 1. It can be observed that mentioned assembly holes 15 and opening 16 of the tow anchor are advantageously already in the tailored blank 20 strategically located to be in a suitable position in the shaped body 10.

Figure 3:
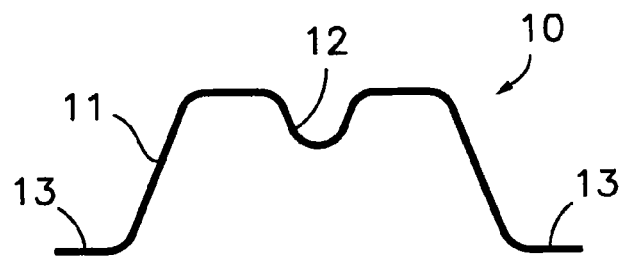
FIG. 3 is a cross-sectional view taken along plane III-III of FIG. 2.
Figure 4:
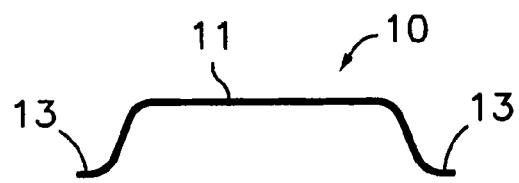
FIG. 4 is a cross-sectional view taken along plane IV-IV of FIG. 2.

FIGS. 3 and 4 show respectively, two cross-sectional views taken along two corresponding planes longitudinally spaced apart along the body 10. The cross-section of FIG. 3 corresponds to the central area of the bumper cross-member and there can be seen said main groove 11 as well as a secondary groove 12 spanning a portion of the width of the main groove 11. In a typical application, the main groove 11 is convex towards the outer part of the vehicle for which the bumper cross-member is provided, whereas said secondary groove 12 is convex towards the inner part. Returning to FIG. 2 it can be observed that the main groove 11 decreases in depth towards both ends of the body 10 and that the secondary groove extends only along a portion of the body 10 without reaching its ends. In FIG. 2 it is also observed how the secondary groove 12 also decreases in depth towards both ends thereof. The cross-section of FIG. 4 corresponds to an area close to one end of the body 10 and there is shown how the main groove 11 has decreased in depth and how the secondary groove 12 has disappeared. In FIGS. 2, 3 and 4, flanges 13 can also be observed extending outwards from side edges of said main groove 11 and along the body 10 forming part of the three-dimensional configuration thereof. It must be indicated that the secondary groove 12 is optional and that obviously the body 10 can incorporate more than one secondary groove 12.

Figure 5:
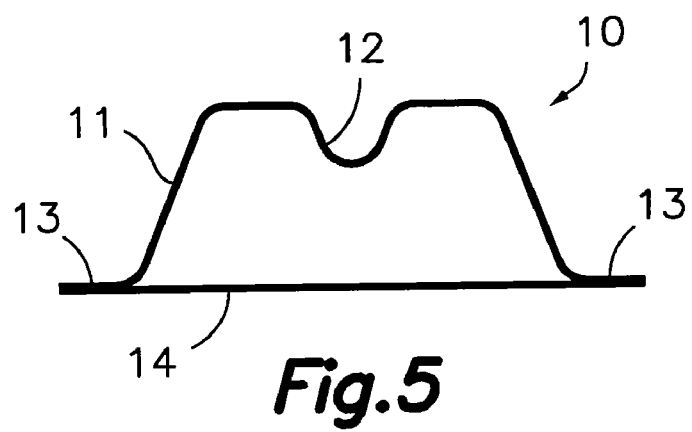
FIG. 5 is a similar view to that of FIG. 2 but with a metal cover joined to the shaped body.

Optionally, as is shown in the cross-section of FIG. 5, the bumper cross-member according to the present invention includes a metal cover 14 joined to the body 10, covering the main groove 11, preferably at least in a central part of its length to leave the assembly holes 15 near the ends accessible. This metal cover 14 is joined to the body 10 for example by means of continuous or stitch laser welding. Alternatively, the metal cover 14 can be formed in several adjacent or separate portions. Obviously according to the present invention, the metal cover 14 can be applied to any body 10 regardless of its configuration, the number of sheet elements it comprises or the composition of those elements.

Figure 6:
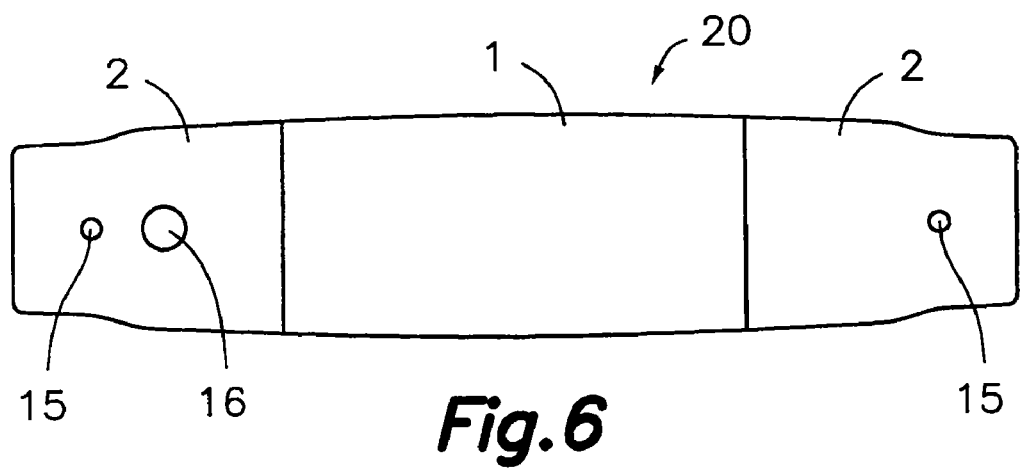
FIG. 6 is a plan view of a tailored blank for obtaining a bumper reinforcing cross-member according to another embodiment of the present invention.
Figure 7:
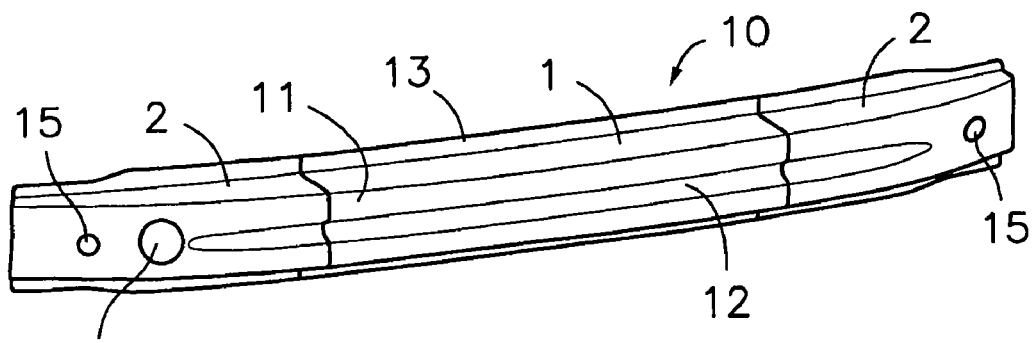
FIG. 7 is a perspective view of a bumper reinforcing cross-member obtained from the tailored blank of FIG. 6.

The exemplary embodiment shown in FIGS. 6 and 7 is similar to that described above with regard to FIGS. 1 and 2 except in that here the tailored blank 20 (FIG. 6) comprises a central sheet element 1 and two end sheet elements 2 placed at both sides of said central sheet element 1 and butt jointed thereto by means of laser welding, plasma welding or high frequency welding, among others. Consequently, the body 10 (FIG. 7) is formed by the central sheet element 1 and two end sheet elements 2 placed side by side of said central sheet element 1. The two end sheet elements 2 can be of the same length or of different lengths. Therefore the term "central sheet element" is not intended to designate one sheet element placed in the geometric central position of the cross-member, but rather in a middle area around said geometric central position. In the example of FIGS. 6 and 7, the assembly holes 15 and the opening 16 of the tow anchor are located in said end sheet elements 2.

Figure 8:
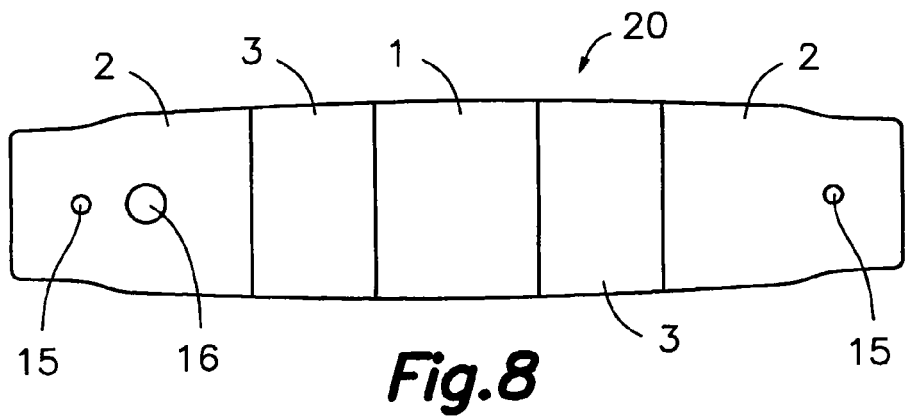
FIG. 8 is a plan view of a tailored blank for obtaining a bumper reinforcing cross-member according to still another embodiment of the present invention.
Figure 9:
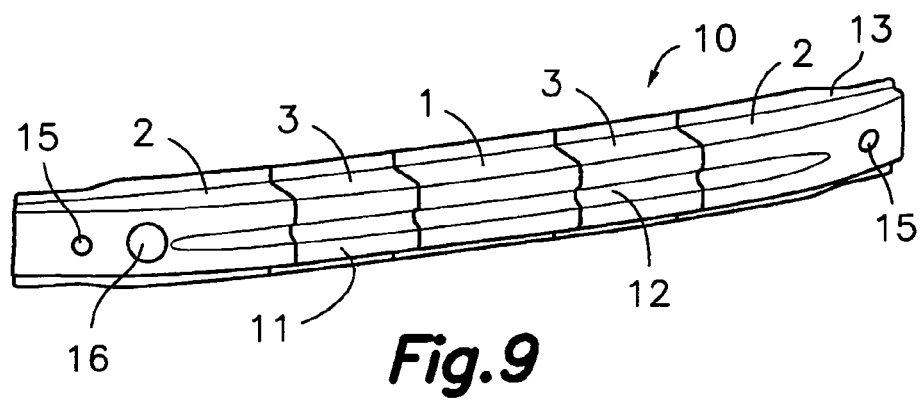
FIG. 9 is a perspective view of a bumper reinforcing cross-member obtained from the tailored blank of FIG. 8.

The embodiment shown in FIGS. 8 and 9 is similar to that described above with regard to FIGS. 1 and 2 except in that here the tailored blank 20 (FIG. 8) comprises a central sheet element 1, two end sheet elements 2 and two intermediate sheet elements 3, each one arranged between said central sheet element 1 and one of said end sheet elements 2. All sheet elements 1, 2, 3 are butt jointed by means of laser welding, plasma welding or high frequency welding, among others. Consequently, the body 10 (FIG. 9) is formed by the central sheet element 1, two end sheet elements 2 and two intermediate sheet elements 3. Also here the assembly holes 15 and the opening 16 of the tow anchor are located in the end sheet elements 2.

FIGS. 10 and 11 and FIGS. 12 and 13 illustrate two other embodiments of the present invention in which several plate elements 4, 5, 5a are overlaid and joined by means of remote head stitch laser welding or electrical resistance spot welding. In general, one of the plate elements forming the tailored blank acts as a base upon which one or more reinforcing plate elements are overlaid. The reinforcing plate elements can be placed in different areas of the base plate element or mutually overlaid in the same area. The reinforcing plate elements can be arranged to be in the inner part or in the outer part of the bumper cross-member.

Figure 10:
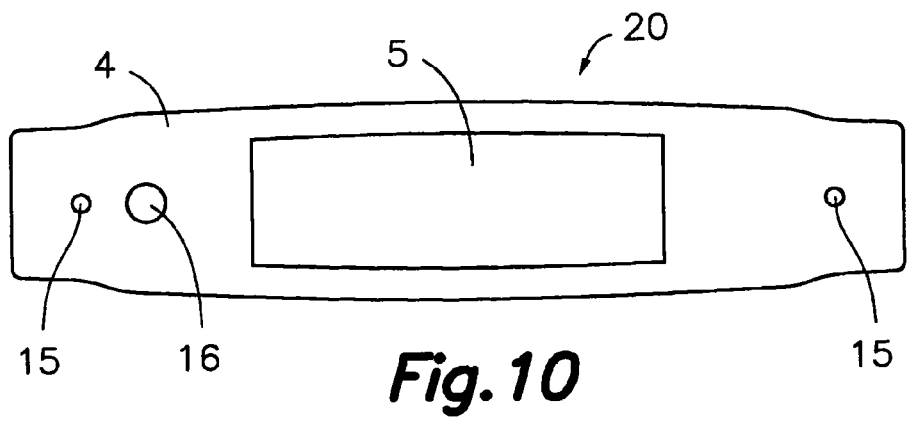
FIG. 10 is a plan view of a tailored blank for obtaining a bumper reinforcing cross-member according to another additional embodiment of the present invention.
Figure 11:
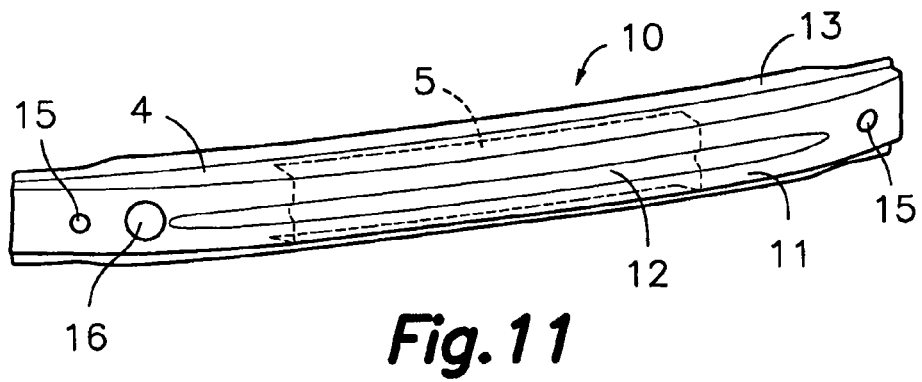
FIG. 11 is a perspective view of a bumper reinforcing cross-member obtained from the tailored blank of FIG. 10.

In the embodiment of FIGS. 10 and 11, the tailored blank 20 (FIG. 10) comprises a base sheet element 4 and a reinforcing sheet element 5 overlaid on a central area of said base sheet element 4. Consequently, the body 10 (FIG. 11) is formed by the base sheet element 4 and the reinforcing sheet element 5 overlaid on a central area of the base sheet element 4. In this case, the assembly holes 15 and the opening 16 of the tow anchor are located in areas of the base sheet element 4 in which the reinforcing sheet element 5 is not overlaid.

Figure 12:
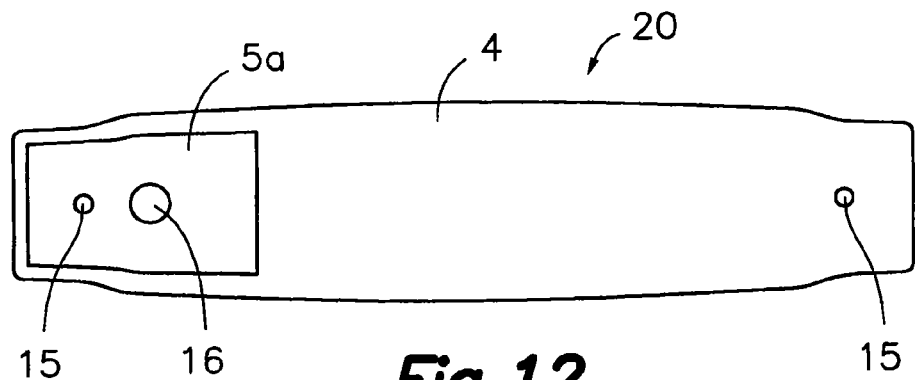
FIG. 12 is a plan view of a tailored blank for obtaining a bumper reinforcing cross-member according to still another additional embodiment of the present invention.
Figure 13:
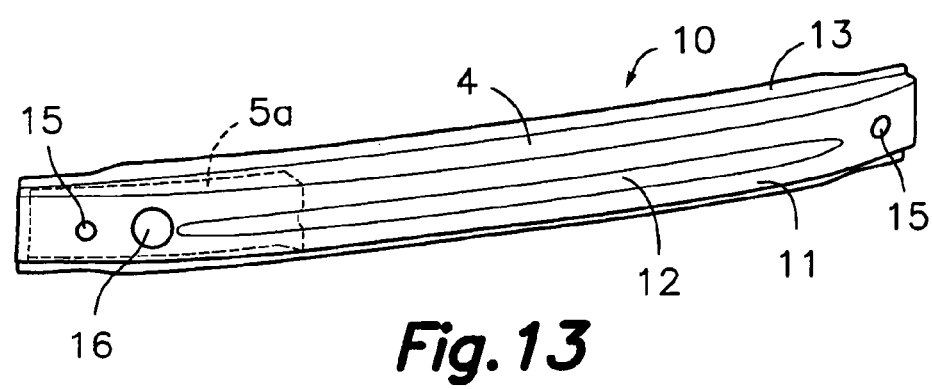
FIG. 13 is a perspective view of a bumper reinforcing cross-member obtained from the tailored blank of FIG. 12.

In the exemplary embodiment of FIGS. 12 and 13, the tailored blank 20 (FIG. 12) comprises a base sheet element 4 and a reinforcing sheet element 5a overlaid on a central area of said base sheet element 4. Consequently, the body 10 (FIG. 13) is formed by the base sheet element 4 and the reinforcing sheet element 5a overlaid on a central area of the base sheet element 4. Here one of the assembly holes 15 and the opening 16 of the tow anchor are located in an area of the cross-member in which the base sheet element 4 and the reinforcing sheet element 5a are overlaid, whereas the other assembly hole 15 is located in an area in which the base sheet element 4 is not reinforced.

Figure 14:
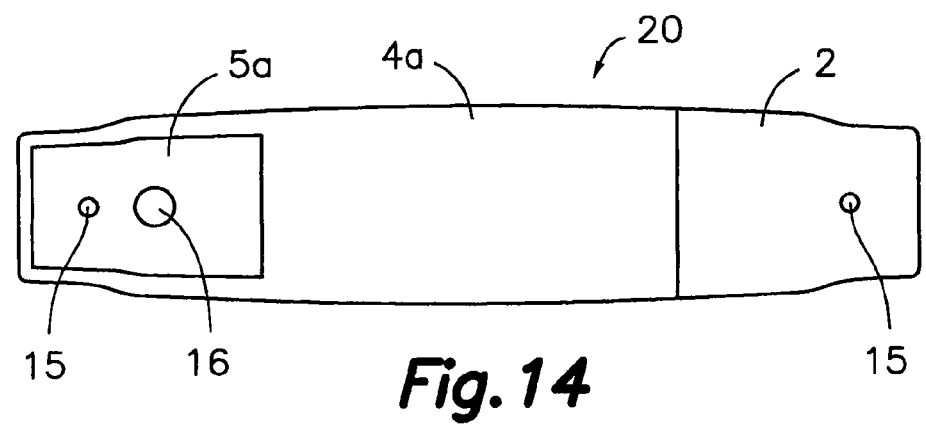
FIG. 14 is a plan view of a tailored blank for obtaining a bumper reinforcing cross-member according to still another additional embodiment of the present invention.
Figure 15:
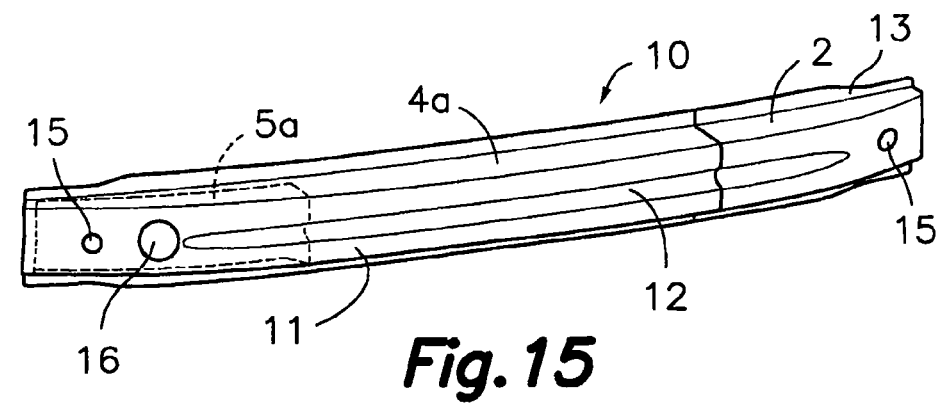
FIG. 15 is a perspective view of a bumper reinforcing cross-member obtained from the tailored blank of FIG. 14.

FIGS. 14 and 15 illustrate an embodiment in which several plate elements 2, 4a, 5a are combined such that some of them are adjacent and others are overlaid. Thus, the tailored blank 20 (FIG. 14) comprises a base sheet element 4a spanning a central area and one of the ends, a reinforcing sheet element 5a overlaid on said base sheet element 4a spanning the mentioned end and an end sheet element 2 located adjacent to the base sheet element 4a spanning the other end. The base sheet element 4a and the reinforcing sheet element 5a overlaid on the former are joined by means of remote head stitch laser welding or electrical resistance spot welding. The base sheet element 4a and the end sheet element 2 adjacent thereto are butt jointed by means of a technique selected from a group including laser welding, plasma welding and high frequency welding, among others. Consequently, the body 10 (FIG. 15) is formed by the base sheet element 4a, the reinforcing sheet element 5a overlaid on an end area thereof, and the end sheet element 2 adjacent to the base sheet element 4a and butt jointed thereto at the other end. Here one of the assembly holes 15 and the opening 16 of the tow anchor are located in an area of the cross-member in which the base sheet element 4a and the reinforcing sheet element 5a are overlaid, whereas the other assembly hole 15 is located in the end sheet element 2.

Stamping to confer the three-dimensional configuration of the body 10 to the tailored blank 20, whether it is obtained by the tailored blank or patchwork blank technique, can be hot stamping or conventional cold stamping, as described above. The outline of the sheet elements as well as the assembly holes 15 and the opening 16 of the tow anchor can be carried out by punching, for example, on individual plate elements or on the tailored blank.

A person skilled in the art will be able to introduce variations and modifications in the embodiments shown and described without departing from the scope of the present invention as it is defined in the following claims.

The invention claimed is:

1. A bumper reinforcing cross-member, comprising an elongated body having a three-dimensional configuration formed from several metal sheet elements joined together by means of welding and then shaped, said three-dimensional configuration having a non-uniform open cross-section along said body, wherein said three-dimensional configuration comprises a main groove extending along the entire body substantially spanning the width thereof, the depth of said main groove decreasing towards both ends of the body, and wherein said three-dimensional configuration further comprises at least one secondary groove extending alone a portion of the bottom of said main groove spanning a portion of its width, said secondary groove decreasing in depth towards both ends thereof.

2. A cross-member according to claim 1, wherein the several metal sheet elements are butt jointed.

3. A cross-member according to claim 1, wherein the several metal sheet elements are joined by overlaying.

4. A cross-member according to claim 1, wherein the several metal sheet elements are of the same type of steel.

5. A cross-member according to claim 1, wherein the several metal sheet elements are of different types of steel.

6. A cross-member according to claim 5, wherein the several metal sheet elements are of identical thickness.

7. A cross-member according to claim 5, wherein the several metal sheet elements are of different thicknesses.

8. A cross-member according to claim 2, further comprising a larger sheet element spanning a central area and one end, and a smaller sheet element located adjacent to said larger sheet element spanning the other end.

9. A cross-member according to claim 2, further comprising a central sheet element and two end sheet elements located side by side of said central sheet element.

10. A cross-member according to claim 2, further comprising a central sheet element, two end sheet elements and two intermediate sheet elements, each one arranged between said central sheet element and one of said end sheet elements.

11. A cross-member according to claim 3, further comprising a base sheet element and a reinforcing sheet element overlaid on a central area of said base sheet element.

12. A cross-member according to claim 3, further comprising a base sheet element and a reinforcing sheet element overlaid on an end area of said base sheet element.

13. A cross-member according to claim 1, wherein said three-dimensional configuration comprises a general arched shape longitudinally along the body.

14. A cross-member according to claim 13, wherein said three-dimensional configuration comprises flanges extending outwards from side edges of said main groove and along the body.

15. A cross-member according to claim 14, further comprising at least one metal cover joined by welding to the body covering at least part of the length of the main groove.

16. A cross-member according to claim 1, wherein said three-dimensional configuration is obtained by stamping said metal sheet elements once joined together.

17. A cross-member according to claim 16, wherein said three-dimensional configuration is obtained by hot stamping.

18. A cross-member according to claim 16, wherein said three-dimensional configuration is obtained by cold stamping.

19. A cross-member according to claim 16, wherein said three-dimensional configuration is obtained by first pre-shaping the blank by cold stamping and subsequently complete shaping the blank by hot stamping.

* * * * *